United States Patent
Masuda et al.

(10) Patent No.: US 6,549,369 B1
(45) Date of Patent: Apr. 15, 2003

(54) MULTILAYER FILM CORE MAGNETIC HEAD WITH BONDING GLASSES OF DIFFERING THERMAL EXPANSION COEFFICIENTS

(75) Inventors: Kazue Masuda, Niigata-ken (JP); Hiroshi Yamagami, Niigata-ken (JP); Kinya Aoyagi, Niigata-ken (JP); Junichi Niijima, Niigata-ken (JP); Koji Suzuki, Niigata-ken (JP); Masao Aoki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/521,716

(22) Filed: Mar. 9, 2000

(30) Foreign Application Priority Data

Mar. 12, 1999 (JP) .............................. 11-067584

(51) Int. Cl.[7] .............................................. G11B 5/147
(52) U.S. Cl. ........................................................ 360/126
(58) Field of Search ................................ 360/125, 126, 360/120, 119, 127

(56) References Cited

U.S. PATENT DOCUMENTS

| | | | | |
|---|---|---|---|---|
| 4,711,018 A | * | 12/1987 | Matsuzawa | 360/125 |
| 4,890,378 A | * | 1/1990 | Suzuki et al. | 360/119 |
| 4,953,048 A | * | 8/1990 | Kameyama et al. | 360/119 |
| 5,113,299 A | * | 5/1992 | Onoe | 360/120 |
| 5,222,006 A | * | 6/1993 | Yanagi | 360/126 |
| 5,231,555 A | * | 7/1993 | Itoh et al. | 360/127 |
| 5,289,329 A | * | 2/1994 | Hirano et al. | 360/121 |
| 5,519,555 A | * | 5/1996 | Naitoh et al. | 360/125 |
| 5,708,543 A | | 1/1998 | Honda et al. | |
| 5,764,450 A | | 6/1998 | Sato et al. | |
| 5,764,455 A | | 6/1998 | Matsunaga et al. | |
| 5,799,389 A | | 9/1998 | Kimura | |
| 5,867,887 A | | 2/1999 | Kumagai et al. | |
| 6,061,212 A | * | 5/2000 | Honma | 360/126 |

FOREIGN PATENT DOCUMENTS

JP          07-161011          * 6/1995

* cited by examiner

Primary Examiner—Craig A. Renner
(74) Attorney, Agent, or Firm—Brinks Hofer Gilson & Lione

(57) ABSTRACT

A magnetic head includes a pair of magnetic core halves provided with at least metal magnetic films are combined together so that the metal magnetic thin films of one of the pair of magnetic core halves are abutted on the thin films of the other. A winding slot is provided in the abutting portions between the pair of magnetic core halves to form a front gap and back gap on both sides of the winding slot. The pair of magnetic core halves are bonded together with first bonding glass adjacent to the back gap, and second bonding glass adjacent to the front gap, which as a thermal expansion coefficient higher than that of the first bonding glass.

9 Claims, 3 Drawing Sheets

MULTILAYER FILM CORE MAGNETIC HEAD WITH BONDING GLASSES OF DIFFERING THERMAL EXPANSION COEFFICIENTS

BACKGROUND OF THE INVENTION

1. Field of the Invention

The present invention relates to a magnetic head comprising a metal magnetic thin film.

2. Description of the Related Art

In the field of magnetic recording, digital-system magnetic recording is becoming the mainstream in place of a conventional analog system. Particularly, digital system VTR is being rapidly popularized, and VTR magnetic heads are required to have higher performance.

A conventional digital-system VTR reproduction magnetic head comprises a so-called MIG-type magnetic head in which a soft magnetic alloy film is provided in a magnetic gap.

However, such a MIG-type magnetic head has a problem in that reproduction of digital signals causes various noises in reproduced signals, increasing an error rate.

Therefore, a laminated magnetic head has recently been used, which comprises a magnetic core having a structure comprising soft magnetic films held between nonmagnetic material layers. In this laminated magnetic head, the magnetic path comprises the soft magnetic films to decrease magnetostriction, thereby causing relatively low noise. The magnetic head comprising soft magnetic films laminated with insulating films provided therebetween has the advantage of suppressing an eddy current loss in the radio-frequency region and thus improving characteristics in the radio-frequency region.

Since the magnetic path comprises the soft magnetic films, the total thickness of the soft magnetic films equals the track width, and thus the track can easily be narrowed, thereby improving the recording density and preventing interference from adjacent tracks.

Furthermore, with the soft magnetic films each comprising a metal magnetic thin film made of an alloy system containing Fe and an additive element, it is possible to suppress a decrease in permeability in the radio-frequency region.

In the laminated magnetic head, the metal magnetic films comprising a plurality of metal magnetic thin films laminated with interlayer insulating layers provided therebetween are interposed between nonmagnetic substrates to form each of a pair of magnetic core halves. The magnetic core halves are bonded to each other with bonding glass provided therebetween so that the metal magnetic films of one of the pair of magnetic core halves are arranged in line with the metal magnetic films of the other and abutted thereon with a gap layer provided therebetween.

Each of the metal magnetic films has a thickness of 10 to 20 $\mu$m, while each of the substrates for holding the metal magnetic films therebetween has a thickness of several mm, and thus the thickness of each of the magnetic core halves is substantially determined by the thickness of the substrates. Namely, the substrates are mainly exposed to the abutting surfaces of the magnetic core halves. Therefore, in bonding the pair of magnetic core halves with bonding glass, the bonding glass is fused to the substrates to bond together the pair of magnetic core halves with the bonding glass provided therebetween.

The magnetic core halves are generally bonded at a temperature higher than the softening temperature of the bonding glass. However, such bonding has the problem of easily causing cracks in the bonding glass or separation of the bonding glass and the magnetic core halves during the cooling process of the substrates and the bonding glass after completion of the bonding. This problem is considered to frequently occur when a difference of the thermal expansion coefficients between the bonding glass and the substrates is great. Therefore, in order to solve this problem of the bonding glass, bonding glass having substantially the same thermal expansion coefficient as the substrates used is conventionally selected.

However, each of the magnetic core halves which constitute the laminated magnetic head has a structure in which the multilayered metal magnetic films are held between the substrates, thereby increasing the number of junction portions between components, and decreasing bonding strength, as compared with a MIG-type magnetic head. Particularly, the vicinity of a front gap near a sliding surface for a magnetic recording medium has a structure weak against external stress.

Therefore, even by using bonding glass having a thermal expansion coefficient equal to that of the substrates, the bonding strength of the front gap cannot be increased, and thus machining after the magnetic core halves are bonded together with the bonding glass has the probability of readily causing cracks in the bonding glass in the vicinity of the front gap or separation of the bonding glass from the magnetic core halves due to, for example, stress applied in machining.

SUMMARY OF THE INVENTION

The present invention has been achieved for solving the above problem, and it is an object of the present invention to provide a magnetic head permitting an increase in bonding strength near a front gap.

In order to achieve the object, the present invention provides a magnetic head comprising a pair of magnetic core halves each of which comprises at least metal magnetic thin films and which are combined so that the metal magnetic thin films of one of the magnetic core halves are abutted on the thin films of the other, wherein a winding slot is provided in the abutting portions between the pair of the magnetic core halves to form front gap and back gap on both sides of the winding slot, and the pair of the magnetic core halves are bonded together with first bonding glass adjacent to the back gap and second bonding glass adjacent to the front gap, which has a thermal expansion coefficient higher than the first bonding glass.

In this magnetic head, since the second bonding glass has a thermal expansion coefficient higher than that of the first bonding glass, the volumetric shrinkage rate of the second bonding glass in solidification from a softened state is higher than that of the first bonding glass. Therefore, the second bonding glass volumetrically shrinks by solidification while being fused to the pair of the magnetic core halves, and thus the pair of the magnetic core halves are attracted to each other by the second bonding glass to strongly bond the front gap.

In the magnetic head of the present invention, each of the pair of the magnetic core halves comprises metal magnetic films which are formed by laminating a plurality of the metal magnetic thin films with interlayer insulating layers provided therebetween, and which are held between substrates so that the metal magnetic films extend to the sides of the substrates, and the pair of magnetic core halves are abutted on each other with a gap layer provided in the front gap therebetween so that the metal magnetic films of one of the magnetic core halves are arranged in line with the metal magnetic films of the other.

In the magnetic head, since the magnetic path comprises the metal magnetic films, the total thickness of the metal magnetic films equals the track width, and the track can easily be narrowed, thereby improving the recording density, and preventing interference with adjacent tracks. It is also possible to strongly bond the front gap having a structure having many junction portions between components and weakness against external stress.

Furthermore, in the magnetic head of the present invention, the winding slot and a reinforcing groove are provided in the abutting portions between the pair of the magnetic core halves to form the front gap and back gap on both sides of the winding slot, the back gap is located between the winding slot and the reinforcing groove, and the pair of the magnetic core halves are bonded together with the first bonding glass arranged in the reinforcing groove adjacent to the back gap, and the second bonding glass arranged in the winding slot adjacent to the front gap.

In the magnetic head, the pair of the magnetic core halves are combined so that the front gap, the winding slot, the back gap, and the reinforcing groove are arranged in the abutting portions between the magnetic core halves in this order from an end serving as a sliding surface for a magnetic recording medium to the other end. The second bonding glass arranged in the winding slot is adjacent to the front gap, and held between the magnetic core halves, and the first bonding glass arranged in the reinforcing groove is adjacent to the back gap and held between the magnetic core halves.

Since the second bonding glass has a thermal expansion coefficient higher than that of the first bonding glass, the volume shrinkage rate of the second bonding glass in solidification from a softened state is higher than that of the first bonding glass.

Therefore, in solidification, the second bonding glass volumetrically shrinks while being fused to the pair of the magnetic core halves, and thus the pair of the magnetic core halves are attracted to each other by the second bonding glass to strongly bond the front gap.

In the magnetic head of the present invention, therefore, the front gap having a complicated structure weak against external stress is strongly bonded due to a difference between the thermal expansion coefficients of the second bonding glass and the first bonding glass, thereby improving the bonding strength of the front gap.

Particularly, assuming that the thermal expansion coefficient of first bonding glass is $\alpha_1$, and the thermal expansion coefficient of the second bonding glass is $\alpha_2$, the ratio ($\alpha_2/\alpha_1$) between the thermal expansion coefficients is over 1.0 and not more than 1.2, more preferably over 1.0 and not more than 1.1.

The ratio ($\alpha_1/\alpha_S$) of the thermal expansion coefficient $\alpha_1$ of the first bonding glass to the thermal expansion coefficient $\alpha_S$ of the substrates is preferably in the range of 106/123 to 112/115.

Although the thermal expansion coefficient ($\alpha_1$) of the first bonding glass is preferably in the range of $106 \times 10^{-7}$ to $112 \times 10^{-7}$, and the thermal expansion coefficient ($\alpha_2$) of the second bonding glass is preferably in the range of $106 \times 10^{-7}$ to $130 \times 10^{-7}$, the thermal expansion coefficients are not limited to these ranges as long as the above-described conditions are satisfied.

The thermal expansion coefficients of the first bonding glass, the second bonding glass, and the substrates are values in the temperature range of 200 to 300° C.

With a ratio $\alpha_2/\alpha_1$ in the range of over 1.0 and not more than 1.2, the bonding strength of the front gap be increased, and with a ratio $\alpha_2/\alpha_1$ in the range of over 1.0 and not more than 1.1, the bonding strength of the front gap can be further increased.

With a ratio $\alpha_1/\alpha_S$ of the thermal expansion coefficient ($\alpha_1$) of the first bonding glass to the thermal expansion coefficient ($\alpha_S$) of the substrates in the above range, the bonding strength of the front gap can be increased with no thermal stress applied during cooling of the first bonding glass.

DESCRIPTION OF THE PREFERRED EMBODIMENT

A first embodiment of the present invention will be described below with reference to the drawings.

Figure 1:
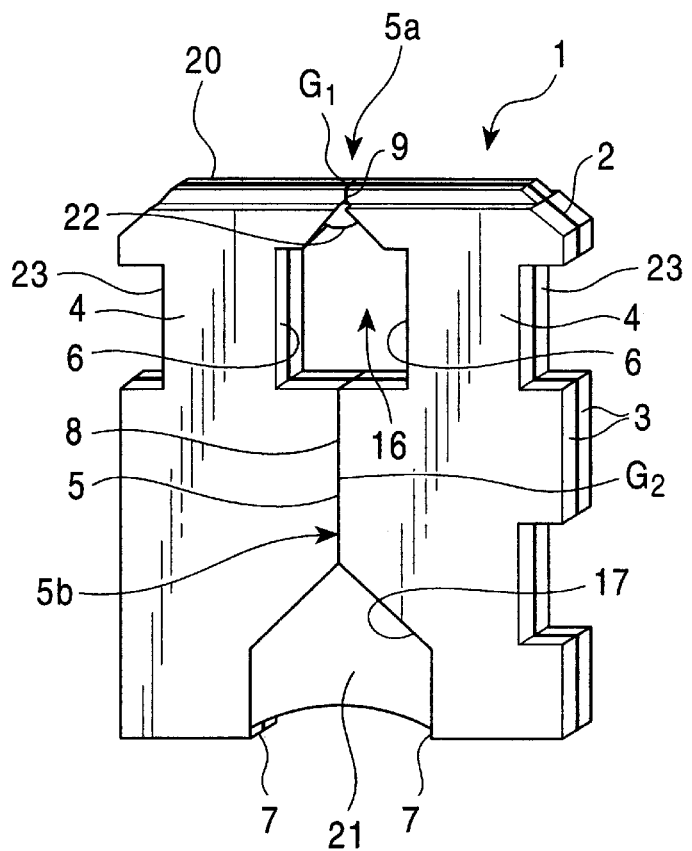
FIG. 1 is a perspective view showing a magnetic head in accordance with a first embodiment of the present invention.

FIG. 1 shows a laminated magnetic head in accordance with a first embodiment of the present invention. A magnetic head 1 comprises a pair of magnetic core having 4 which are formed by holding layered structure metal magnetic films 2 with substrates 3 and the pair of magnetic core halves are abutted on each other.

As shown in FIG. 1, a winding groove 6 is provided on the abutting surface 5 of each of the magnetic core halves 4 to an end 5a thereof. Also, a reinforcing notch 7 is provided in the abutting surface of each of the magnetic core halves 4 on the other end 5b thereof. A portion of the abutting surface 5 between the winding groove 6 and the reinforcing notch 7 serves as a back gap surface 8, and the end 5a of the abutting surface 5 serves as a front gap surface 9.

Each of the substrates 3 is preferably made of ferrite, ceramic, crystalline glass, alumina, or the like, and particularly, calcium ferrite, Mn—Zn ferrite, MnO—NiO system ceramics, CaTiO$_3$ system ceramics, and the like are preferred.

Figure 2:
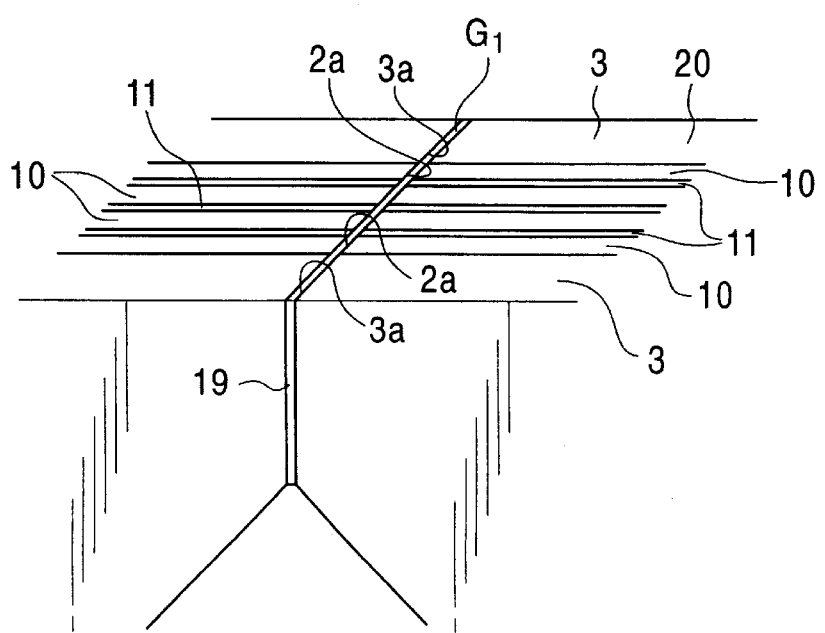
FIG. 2 is an enlarged view showing the vicinity of the front gap of the magnetic head shown in FIG. 1.

As shown in an enlarged view of FIG. 2, the metal magnetic films 2 comprise a plurality of metal magnetic thin films 10 laminated with interlayer insulating films 11 provided therebetween, and are held between the substrates 3 in the thickness direction thereof so that ends 2a of the metal magnetic films 2 of each magnetic core half extend to sides 3a of the corresponding substrates 3.

Each of the interlayer insulating layers 11 is preferably made of SiO$_2$.

As shown is FIGS. 1 and 2, the pair of magnetic core halves 4 are abutted on each other in a manner that the metal magnetic films 2 of one of the magnetic core halves 4 are arranged in line with the magnetic films 2 of the other, with a gap layer 19 provided between the front gap surfaces 9.

The winding grooves 6 form a winding slot 16, and the reinforcing notches 7 form a reinforcing groove 17.

In addition, grooves 23 are formed on both sides of the winding slot 16 by notching the sides of the magnetic core halves 4 so that a current-carrying coil can be wound on each of the magnetic core halves 4.

The gap layer 19 preferably comprises $SiO_2$, and is bonded to each of the magnetic core halves 4 with paste glass comprising Pb-type glass or the like.

In this way, the pair of the magnetic core halves 4 are combined together to form the laminated magnetic head 1. As a result, the front gap $G_1$, the winding slot 16, the back gap $G_2$, and the reinforcing groove 17 are arranged in the abutting portions between the pair of the magnetic core halves 4 of the magnetic head 1 in this order from the end 5a adjacent to the sliding surface 20 for a magnetic recording medium to the other end 5b.

Furthermore, first bonding glass 21 is arranged in the reinforcing groove 17, and second bonding glass 22 is arranged in the winding slot 16. The first bonding glass 21 is held between the magnetic core halves 4 to be bonded to the magnetic core halves 4 at the other end 5b adjacent to the back gap $G_2$ through a fusing process of the first bonding glass.

The second bonding glass 22 preferably has a thermal expansion coefficient ($\alpha_2$) greater than the thermal expansion coefficient ($\alpha_1$) of the first bonding glass 21.

With the second bonding glass 22 having a thermal expansion coefficient ($\alpha_2$) greater than the thermal expansion coefficient ($\alpha_1$) of the first bonding glass 21, the volume shrinkage rate of the second bonding glass 22 in solidification from a softened state is greater than that of the firs bonding glass 21.

Therefore, in bonding the magnetic core halves 4 together to produce the magnetic head 1, the second bonding glass 22 is solidified from a softened state to volumetrically shrunk while being fused and bonded to the pair of magnetic core halves 4. As a result, the pair of magnetic core halves 4 are attracted to each other by the second bonding glass 22 to strongly bond the front gap $G_1$.

Also, the first bonding glass 21 at the other end 5b is solidified from a softened state and volumetrically shrinks while being fused and bonded to the pair of the magnetic core halves 4 in a manner that the pair of the magnetic core halves 4 are attracted to each other by the first bonding glass 21 at the other end 5b. However, since the volume shrinkage rate of the first bonding glass 21 is smaller than that of the second bonding glass 22, the back gap $G_2$ is bonded more weakly than the front gap $G_1$.

In the magnetic head 1, therefore, the front gap $G_1$ having a complicated structure conventionally having a weakness against external stress is strongly bonded due to a difference of the thermal expansion coefficients between the second bonding glass 22 and the first bonding glass 21, thereby increasing the bonding strength of the front gap $G_1$. For example, even when stress is applied in machining after bonding of the magnetic core halves 4, the second bonding glass 22 is not cracked, and the second bonding glass 22 and the magnetic core halves 4 are not separated.

With respect to the thermal expansion coefficient of the first and second bonding glasses 21 and 22, the ratio ($\alpha_2/\alpha_1$) of the thermal expansion coefficient ($\alpha_2$) of the second bonding glass 22 to the thermal expansion coefficient ($\alpha_1$) of the first bonding glass 21 is over 1.0 and not more than 1.2, and more preferably over 1.0 and not more than 1.1.

With a ratio $\alpha_2/\alpha_1$ in the range of over 1.0 and not more than 1.2, the bonding strength of the front gap $G_1$ can be increased, while with a ratio $\alpha_2/\alpha_1$ in the range of over 1.0 and not more than 1.1, the bonding strength of the front gap $G_1$ can be further increased.

With a ratio $\alpha_2/\alpha_1$ of less than 1.0, because the thermal expansion coefficient ($\alpha_2$) of the second bonding glass 22 is smaller than the thermal expansion coefficient ($\alpha_1$) of the first bonding glass 21, the back gap $G_2$ of the magnetic head 1 is strongly bonded, and the front gap $G_1$ cannot be strongly bonded. With a ratio $\alpha_2/\alpha_1$ of over 1.2, because the thermal expansion coefficient ($\alpha_2$) of the second bonding glass 22 is greater than the thermal expansion coefficient ($\alpha_1$) of the first bonding glass 21, a difference between the volume shrinkage rates of the first and second bonding glasses 21 and 22 is increased. Therefore, in solidifying the first and second bonding glasses 21 and 22, stress is applied to the magnetic core halves 4 to undesirably deteriorate the soft magnetic properties of the metal magnetic films 2.

The thermal expansion coefficient ($\alpha_1$) of the first bonding glass 21 is preferably in the range of $106 \times 10^{-7}$ to $112 \times 10^{-7}$, and the thermal expansion coefficient ($\alpha_2$) of the second bonding glass 22 is preferably in the range of $106 \times 10^{-7}$ to $130 \times 10^{-7}$. However, the thermal expansion coefficients are not limited to these values as long as the above-mentioned conditions are satisfied.

The ratio ($\alpha_1/\alpha_S$) of the thermal expansion coefficient ($\alpha_1$) of the first bonding glass 21 to the thermal expansion coefficient ($\alpha_S$) of the substrates 3 is preferably in the range of 106/123 to 112/115. With the ratio of the thermal expansion coefficient of the first bonding glass 21 to that of the substrate 3 in the above range, bonding the magnetic core halves 4 causes neither cracking in the first bonding glass 21 nor separation of the first bonding glass 21 from the magnetic core halves 4.

With a ratio ($\alpha_1/\alpha_S$) of less than 106/123 or over 112/115, a difference of between the thermal expansion coefficients ($\alpha_1$ and $\alpha_S$) between the first bonding glass 21 and the substrate 3 is increased, thereby increasing a difference between the volume shrinkage rates of the first bonding glass 21 and the substrates 3 during cooling to solidify the first bonding glass 21 from a softened state. Therefore, thermal stress is applied to the first bonding glass 21 to undesirably cause cracking in the first bonding glass 21 or separation of the first bonding glass 21 from the magnetic core halves 4.

The thermal expansion coefficients of the first bonding glass 21, the second bonding glass 22 and the substrates 3 have values determined in the temperature range of 200 to 300° C.

As the soft magnetic material for forming the metal magnetic thin films 10, Co—Ta—Hf system soft magnetic thin films, Sendust thin films, and the like can be used.

The Co—Ta—Hf system soft magnetic thin films are disclosed in Japanese Patent Application No. 63-291992 filed by the inventors of the present invention. Examples of such Co—Ta—Hf system soft magnetic thin films include a system comprising the fundamental composition Co—Ta—Hf, and at least one element selected from Rh, Pb, Os, Ir, Pt, and Au, a system comprising the fundamental composition Co—Ta—Hf, at least one element selected from Rh, Pb, Os, Ir, Pt, and Au, and element X (Y, Al, Si, B, or the like) added for improving resistivity, and the like. Although preferred compositions include $Co_{68-90}Ta_{1-14}Hf_{1-18}$, $Co_{68-90}Ta_{1-14}Hf_{1-18}X$, and the like, of course, other compositions can also be used. In these compositions, for example, $Co_{68-90}$ means that the Co composition ratio is 68 atomic % to 90 atomic %.

By using a Co—Ta—Hf system soft magnetic thin film, it is possible to obtain characteristics such as a saturation magnetic flux density of about 0.8T, a permeability of about 4000 (1 MHz), and resistivity (ρ) of about 150, etc. The use of sendust permits the achievement of characteristics such as a saturation magnetic flux density of 1.1 T, a permeability of about 2000, etc.

As the soft magnetic material for forming the metal magnetic thin films 10, materials represented by the formula $Fe_{100-a-b-d-e-f}Si_aAl_bM_dZ_eT_f$ may be used, wherein M represents at least one element selected from Ti, Zr, Hf, V, Nb, Ta, Mo, and W, Z represents one or two elements selected from C and N, T represents at least one element selected from Cr, Ti, Mo, W, V, Re, Ru, Rh, Ni, Co, Pd, Pt, and Au, and the composition ratios a, b, d, e, and f satisfy $8 \leq a \leq 15$, $0.5 \leq b \leq 10$, $1 \leq d \leq 10$, $0.5 \leq e \leq 15$, and $0 \leq f \leq 10$, respectively.

The metal magnetic films 10 are formed by a depostion method such as sputtering using the composition system soft magnetic material, and then heat-treated to precipitate Fe fine crystal grains on the order of several nm to tens of nm in size. In this case, a high saturation magnetic flux density, excellent permeability, and low coercive force are exhibited, and thus excellent soft magnetic properties are obtained, thereby exhibiting excellent properties in use for a laminated magnetic head.

Furthermore, as the soft magnetic material for forming the metal magnetic thin films 10, materials may also be used, which have a body centered cubic structure composed of Fe as a main component, and comprising fine crystals having an average crystal grain diameter of 40 nm or less, and carbide or nitride of at least one element selected from Ti, Zr, Hf, V, Nb, Ta, Mo, and W, which is precipitated in the grain boundaries of the fine crystals, the fine crystals comprising at least one at least one element selected from Si and Al, and Ru dissolved therein.

An example of such materials is preferably represented by the following formula:

$$Fe_{100-a-b-c-d-e}Si_aAl_bRu_cM_dZ_e$$

wherein M is at least one element selected from Ti, Zr, Hf, V, Nb, Ta, Mo, and W, Z represents at least one element selected from C and N, and the composition ratios a, b, c, d, and e by atomic % satisfy the relations $8 \leq a \leq 15$, $0 \leq b \leq 10$, $0.5 \leq c \leq 15$, $1 \leq d \leq 10$, and $1 \leq e \leq 10$, respectively.

The magnetic head 1 comprises the pair of magnetic core halves 4 which are bonded together by the first bonding glass 21 arranged in the reinforcing groove 17, and the second bonding glass 22 arranged in the winding slot 16 and having a thermal expansion coefficient higher than that of the first bonding glass 21. Therefore, the volume shrinkage rate of the second bonding glass 22 in solidification from a softened state is higher than that of the first bonding glass 21. In solidifying the second bonding glass 22, the second bonding glass 22 volumetrically shrinks while being fused and bonded to the magnetic core halves 4, and thus the pair of the magnetic core halves 4 are attracted to each other by the second bonding glass 22 to strongly bond the front gap $G_1$.

In the magnetic head 1, therefore, the front gap $G_1$ having a complicated structure conventionally having a weakness against external stress, is strongly bonded due to a difference between the thermal expansion coefficients of the second bonding glass 22 and the first bonding glass 21, thereby increasing the bonding strength of the front gap $G_1$. For example, even when stress is applied in machining, it is possible to prevent cracking in the second bonding glass 22 adjacent to the front gap $G_1$, and separation of the second bonding glass 22 and the magnetic core halves 4.

Particularly, with a thermal expansion coefficient ratio $(\alpha_2/\alpha_1)$ over 1.0 and not more than 1.2, the bonding strength of the front gap $G_1$ can be increased, while with a thermal expansion coefficient ratio $(\alpha_2/\alpha_1)$ in the range of over 1.0 and not more than 1.1, the bonding strength of the front gap $G_1$ can be further increased.

Furthermore, with a ratio $(\alpha_1/\alpha_S)$ of the thermal expansion coefficient $(\alpha_1)$ of the first bonding glass 21 to the thermal expansion coefficient $(\alpha_S)$ of the substrates 3 in the range of 106/123 to 112/115, the first bonding glass 21 is not cracked, and the first bonding glass 21 and the magnetic core halves 4 are not separated during the bonding process of the magnetic core halves 4.

A second embodiment of the present invention will be described with reference to the drawings.

Figure 4:
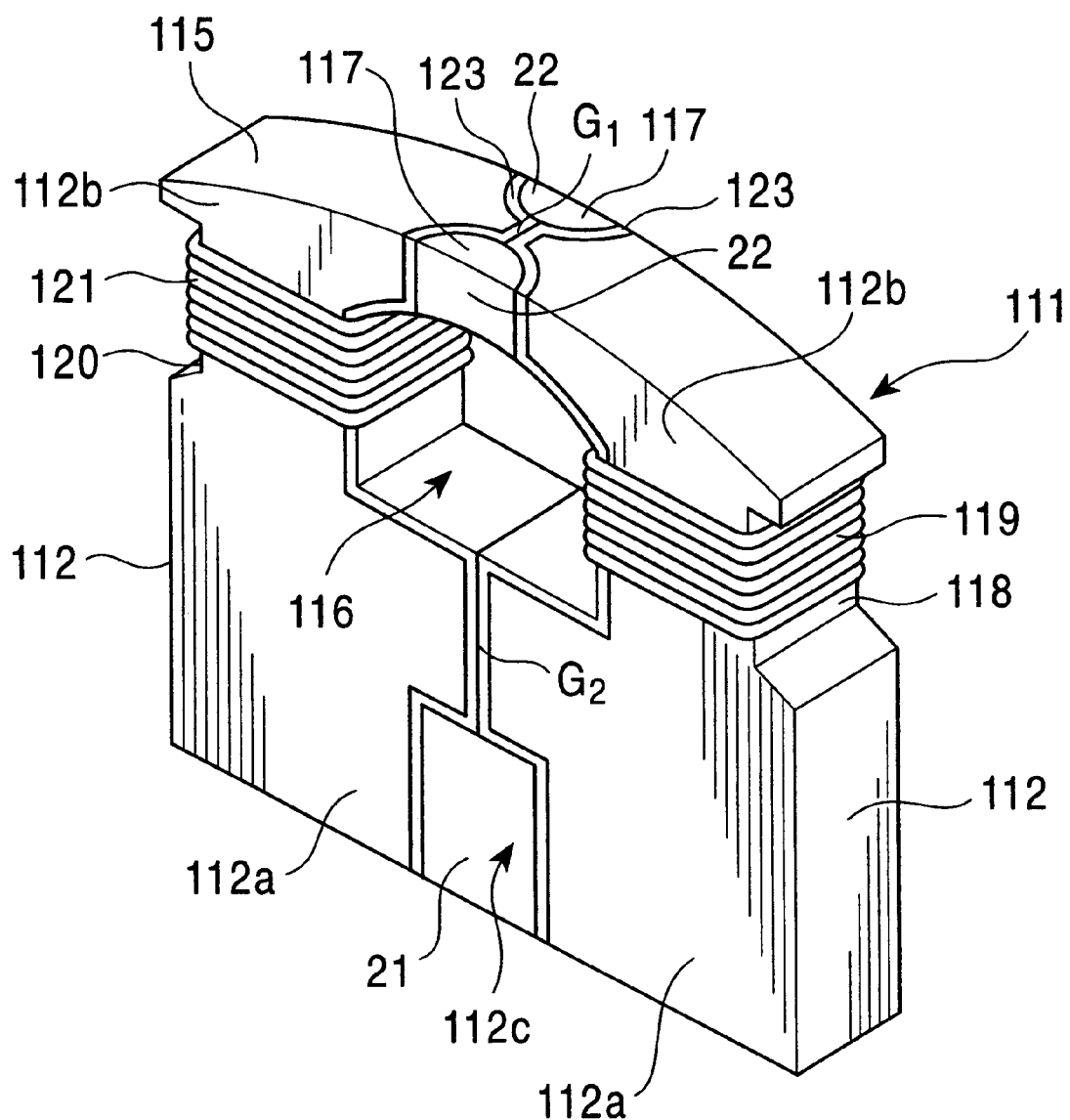
FIG. 4 is a perspective view showing a magnetic head in accordance with a second embodiment of the present invention.

FIG. 4 shows a MIG-type magnetic head in accordance with the second embodiment of the present invention. In FIG. 4, the same components as those shown in FIG. 1 are denoted by the same reference numerals, and detailed description thereof is omitted.

A magnetic head 111 comprises a pair of magnetic core halves 112 made of a ferromagnetic material, first bonding glass 21 bonded to the lower portions 112a of the pair of magnetic core halves 112 to be held between the pair of magnetic core halves 112, and second bonding glass 22 adjacent to the front gap $G_1$, which is filled in controlling grooves 117 for controlling the track width of the front gap $G_1$ exposed from a sliding surface 115. A metal magnetic thin film 123 is formed on the side of each of the pair of the magnetic core halves 112 so that the metal magnetic thin films 123 are opposed to each other in the front gap $G_1$.

The sliding surface 115 is formed on the upper sides of the upper portions 112b of the pair of magnetic core halves 112, the front gap $G_1$ being located at the center of the sliding surface 115.

In the front gap $G_1$, a gap layer (not shown) is provided to be held between the metal magnetic thin films 123 to form a MIG (Metal in Gap) type magnetic head.

Each of the metal magnetic thin films 123 comprises a soft magnetic alloy having higher magnetic permeability than ferrite. Particularly, a Fe—Si—Al alloy, a Fe—Ni alloy, an amorphous alloy, and the like are preferred.

For the gap layer, a nonmagnetic material such as $SiO_2$, $Al_2O_3$, $CrSiO_2$, or the like is used.

Each of the pair of magnetic core halves 112 preferably comprises, for example, a ferromagnetic oxide such as ferrite. As ferrite, MnZn system polycrystalline ferrite, MnZn system single crystal ferrite, MnZnSn system polycrystalline ferrite, etc. are optimum candidates for the use in cores of the magnetic head because of characteristics such as a high saturation magnetic flux density, high magnetic permeability, high electric resistance, low eddy current loss, high hardness, excellent abrasion resistance, etc.

In addition, a winding groove 118 is formed on the outer side of the upper portion of one of the pair of magnetic core halves 112 so that a recording wire 119 is wound in the winding groove 118.

Furthermore, a winding groove 120 is formed on the outer side of the upper portion of the other magnetic core half 112 so that a bias wire 121 is wound in the winding groove 120.

The first bonding glass 21 is filled in a reinforcing groove 112c provided in the lower portions 112a of the magnetic core halves 112 to bond the lower portions 112a of the pair of magnetic core halves 112 with a space therebetween. Also, a recessed portion is formed in the upper portion of each of the opposite sides of the magnetic core halves 112 to define a winding slot 116.

The pair of magnetic core halves 112 are abutted on each other with the metal magnetic thin films 123 provided therebetween to form the back gap $G_2$ between the winding slot 116 and the reinforcing groove 112c. The first bonding glass 21 is positioned adjacent to the back gap $G_2$.

In the magnetic head 111, the pair of magnetic core halves 112 are bonded together with the first bonding glass 21 provided in the reinforcing groove 112c, and the second bonding glass 22 provided in the controlling groove 117 and having a thermal expansion coefficient greater than that of the first bonding glass 21. Therefore, the volume shrinkage rate of the second bonding glass 22 in solidification from a softened state is greater than that of the first bonding glass 21. In solidifying the second bonding glass 22, the second bonding glass 22 thus volumetrically shrinks while being fused and bonded to the pair of magnetic core halves 112, and the pair of magnetic core halves 112 are attracted to each other by the second bonding glass 22 to strongly bond the front gap $G_1$.

Therefore, in the magnetic head 111, the front gap $G_1$ having a complicated structure conventionally having a weakness against external stress is strongly bonded due to a difference between the thermal expansion coefficients of the second bonding glass 22 and the first bonding glass 21, thereby increasing the bonding strength of the front gap $G_1$.

A study was made of the relation between the thermal expansion coefficient of each of the first bonding glass and the second bonding glass and the occurrence rate of cracking, peeling, or the like in the second bonding glass near the front gap.

First, metal magnetic films and interlayer insulating layers were alternately laminated on a substrate composed of calcium ferrite to form metal magnetic films. Another substrate made of calcium ferrite was laminated on the metal magnetic films to form each of a pair of laminations. A winding groove and a reinforcing notch were formed in the end surfaces of each of the pair of laminations to form a pair of magnetic core halves.

The pair of magnetic core halves were next abutted on each other with a gap layer provided therebetween, and rod-like second bonding glass and rod-like first bonding glass were inserted into a winding slot formed by the winding grooves and a reinforcing groove formed by the reinforcing notches, respectively. Then, the first and second bonding glasses were fused and bonded to the magnetic core halves by use of a cooling after heating process, namely heating from 35° to 750° C. and then cooling to room temperature to bond together the pair of magnetic core halves, producing magnetic head samples (1) to (6) as shown in FIGS. 1 and 2.

The first bonding glass used had a thermal expansion coefficient ($\alpha_1$) in the range of $106\times10^{-7}$ to $112\times10_{-7}$, and the second bonding glass used had a thermal expansion coefficient ($\alpha_2$) in the range of $106\times10^{-7}$ to $130\times10^{-7}$. The substrates made of calcium ferrite had a thermal expansion coefficient ($\alpha_1$) in the range of $123\times10^{-7}$.

The thus-obtained magnetic head samples (1) to (6) were examined with respect to the rate of occurrence of cracking in the second bonding glass and separation of the second bonding glass from the magnetic core halves as an occurrence rate of defects. The results are shown in Table 1 and FIG. 3.

TABLE 1

| Sample | Thermal expansion coefficient (x$10^{-7}$) | | Thermal expansion coefficient ratio | Occurrence rate of |
| --- | --- | --- | --- | --- |
| | $\alpha_1$ | $\alpha_2$ | $\alpha_2/\alpha_1$ | defects (%) |
| (1) | 112 | 106 | 0.95 | 32 |
| (2) | 106 | 106 | 1.00 | 48 |
| (3) | 112 | 112 | 1.00 | 33 |
| (4) | 106 | 112 | 1.06 | 22 |
| (5) | 106 | 127 | 1.20 | 39 |
| (6) | 106 | 130 | 1.23 | 68 |

Figure 3:
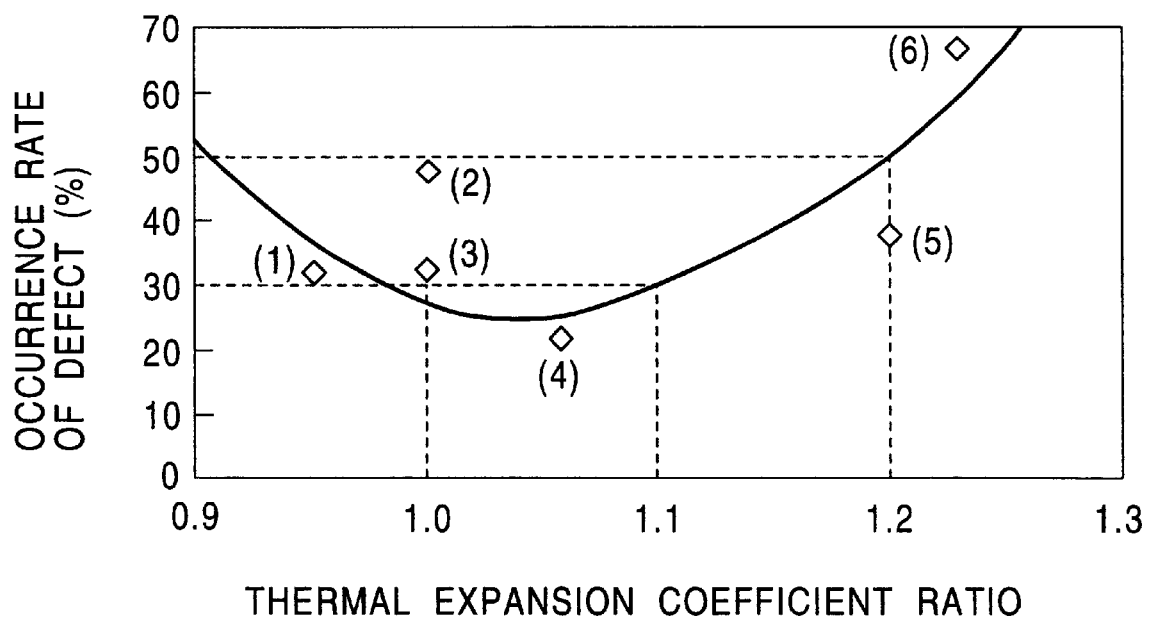
FIG. 3 is a graph showing the relation between the ratio ($\alpha_2/\alpha_1$) of thermal expansion coefficients and the occurrence rate of defects.

Table 1 and FIG. 3 indicate that with a thermal expansion coefficient ratio ($\alpha_2/\alpha_1$) in the range of 0.9 to 1.2, the occurrence rate of defects is 50% or less. FIG. 3 indicates that with a thermal expansion coefficient ratio ($\alpha_2/\alpha_1$) in the range of 1.0 to 1.1, the occurrence rate of defects is 30% or less, and with a thermal expansion coefficient ratio ($\alpha_2/\alpha_1$) 1.06 (Sample (4)), the occurrence rate of defects is 22%.

As described in detail above, the magnetic head of the present invention comprises a pair of magnetic core halves each of which comprises at least metal magnetic thin films, and which are combined together, wherein the pair of the magnetic core halves are bonded together by first bonding glass adjacent to a back gap and second bonding glass adjacent to a front gap, which has a thermal expansion coefficient greater than that of the first bonding glass. Since the second bonding glass has a thermal expansion coefficient greater than that of the first bonding glass, the volume shrinkage rate of the second bonding glass in solidification from a softened state is higher than that of the first bonding glass. Therefore, in solidifying the second bonding glass, the second bonding glass volumetrically shrinks while being fused and bonded to the pair of magnetic core halves, and thus the pair of magnetic core halves are attracted to each other by the second bonding glass to strongly bond the front gap, thereby increasing the bonding strength of the front gap.

The magnetic head of the present invention comprises the pair of magnetic core halves each of which comprises metal magnetic films formed by laminating a plurality of the metal magnetic thin films with interlayer insulating layers provided therebetween, and which are held between substrates, wherein the pair of magnetic core halves are abutted on each other with a gap layer provided in the front gap therebetween so that the metal magnetic films of one of the magnetic core halves are arranged in line with those of the other. Therefore, the magnetic path comprises the metal magnetic films, and the total thickness of the metal magnetic films is equal to the track width, thereby easily narrowing the track. It is thus possible to improve the recording density, prevent interference with adjacent tracks, and increase the bonding strength of the front gap having a structure having many joints between components, and weakness against external stress.

In the magnetic head 111, the pair of magnetic core halves are bonded together by the first bonding glass provided in the reinforcing groove adjacent to the back gap, and the second bonding glass provided in the winding slot adjacent to the front gap. In solidifying the second bonding glass, therefore, the second bonding glass thus volumetrically shrinks while being fused and bonded to the pair of magnetic core halves, and the pair of magnetic core halves are attracted to each other by the second bonding glass to strongly bond the front gap.

Therefore, in the magnetic head of the present invention, the front gap having a complicated structure conventionally having a weakness against external stress is strongly bonded due to a difference between the thermal expansion coefficients of the second bonding glass and the first bonding glass, thereby increasing the bonding strength of the front gap.

With a ratio $\alpha_2/\alpha_1$ in the range over 1.0 and not more than 1.1, the bonding strength of the front gap can further be increased.

Where the ratio $(\alpha_1/\alpha_s)$ of the thermal expansion coefficient $(\alpha_1)$ of the first bonding glass to the thermal expansion coefficient $(\alpha_s)$ of the substrate is in the range of 106/123 to 112/116, the first bonding glass is not cracked, or the first bonding glass and the magnetic core halves are not separated during the bonding process of the magnetic core halves.

What is claimed is:

1. A laminated magnetic head comprising a pair of magnetic core halves each comprising metal magnetic thin films, said magnetic core halves are combined so that the metal magnetic thin films of one of the magnetic core halves abut against the metal magnetic thin films of the other magnetic core half;

wherein a winding slot is provided in the abutting portions between the pair of the magnetic core halves, and the abutment of the core halves form a front gap and a back gap on opposite sides of the winding slot;

the pair of the magnetic core halves are bonded together with first bonding glass adjacent to the back gap, which fills a reinforcing groove formed between the pair of the magnetic core halves on the back side opposite to the winding slot, the thermal expansion coefficient of the first bonding glass is $\alpha_1$, and a second bonding glass adjacent to the front gap, which is located in the winding slot and has a thermal expansion coefficient of $\alpha_2$ which is higher than the thermal expansion coefficient $\alpha_1$ of the first bonding glass, the ratio $(\alpha_2/\alpha_1)$ between the thermal expansion coefficients is over 1.0 and not more than 1.2;

wherein each of the pair of the magnetic core halves comprises a lamination including a plurality of the metal magnetic thin films, insulating film layers provided between said plurality of metal magnetic thin films, and substrates, made of a nonmagnetic material forming the outer most layers of said lamination, the metal magnetic thin films extend to the sides of the substrates, the ratio between the thermal expansion coefficient $\alpha_1$ of the first bonding glass and a substrate of the substrates is in the range of 106:123 to 112:115; and wherein the pair of the magnetic core halves are abutted to each other with a gap layer provided in the front gap there between so that the metal magnetic films of one of the magnetic core halves is arranged in line with the metal magnetic films of the other.

2. A laminated magnetic head according to claim 1, wherein the metal magnetic thin films are Co—Ta—Hf system soft magnetic films.

3. A laminated magnetic head according to claim 1, wherein the metal magnetic thin films are sendust thin films.

4. A laminated magnetic head according to claim 2, wherein the Co—Ta—Hf system soft magnetic films include at least one element selected from Rh, Pb, Os, Ir, Pt and Au and at least one element selected from Y, Al, Si and B.

5. A laminated magnetic head according to claim 1, wherein the metal magnetic thin films are formed by a formula that includes at least one element selected from Ti, Zr, Hf, V, Nb, Ta, Mo and W;

one or two elements selected from C and N; and at least one element selected from Cr, Ti, Mo, W, V, Re, Ru, Rh, Ni, Co, Pd, Pt, and Au.

6. A laminated magnetic head according to claim 1, wherein the metal magnetic thin films are formed from material that has a body centered cubic structure composed of Fe as a main component, and comprising fine crystals having an average crystal grain diameter of 40 nm or less and a carbide or nitride of at least one element selected from Ti, Zr, Hf, V, Nb Ta, Mo, and W which is precipitated in the grain boundaries of the fine crystals; and the fine crystals comprise at least one element selected from Si and Al and Ru dissolved therein.

7. A laminated magnetic head according to claim 6, wherein the body centered cubic structure composed of Fe as a main component includes at least one element selected from C and N.

8. A laminated magnetic head according to claim 1, wherein the insulating film layers comprise $SiO_2$.

9. A laminated magnetic head according to claim 1, wherein each of the substrates comprises calcium ferrite.

* * * * *